US005515202A

United States Patent [19]
Wright

[11] Patent Number: 5,515,202
[45] Date of Patent: May 7, 1996

[54] OPTICAL PROJECTOR ARRANGEMENT COMPRISING A COMPENSATOR

[75] Inventor: Graham L. Wright, Ickenham, England

[73] Assignee: Central Research Laboratories Limited, Middlesex, England

[21] Appl. No.: 379,497

[22] Filed: Mar. 13, 1994

[86] PCT No.: PCT/GB94/01273
§ 371 Date: Jan. 31, 1995
§ 102(e) Date: Jan. 31, 1995

[87] PCT Pub. No.: WO94/30018
PCT Pub. Date: Dec. 22, 1994

[30] Foreign Application Priority Data

Jun. 12, 1993 [GB] United Kingdom ............... 9312170

[51] Int. Cl.$^6$ ............ G02B 27/14; G02F 01/1335; G02F 1/00; G03B 21/26
[52] U.S. Cl. ............... 359/634; 348/757; 353/34; 359/73
[58] Field of Search ............... 359/634, 637, 359/583, 73; 353/31, 34; 348/750, 757

[56] References Cited

U.S. PATENT DOCUMENTS

| | | | |
|---|---|---|---|
| 4,850,685 | 7/1989 | Kamkura | 359/634 |
| 4,935,758 | 6/1990 | Miyatake | 353/31 |
| 5,050,988 | 9/1991 | Sugiyama | 356/121 |
| 5,054,910 | 10/1991 | Kozaki | 353/31 |
| 5,075,798 | 12/1991 | Sonehara | 359/490 |
| 5,097,323 | 3/1992 | Sato | 358/60 |
| 5,105,265 | 4/1992 | Sato | 358/60 |
| 5,241,407 | 8/1993 | Sonehara | 359/40 |
| 5,251,058 | 10/1993 | MacArthur | 359/249 |
| 5,264,951 | 11/1993 | Takanashi | 359/53 |

FOREIGN PATENT DOCUMENTS

| | | |
|---|---|---|
| 487407 | 5/1992 | European Pat. Off. . |
| 57-181518 | 11/1982 | Japan . |
| 3035285 | 2/1991 | Japan . |

*Primary Examiner*—Georgia Y. Epps
*Assistant Examiner*—R. Mack
*Attorney, Agent, or Firm*—Keck, Mahin & Cate

[57] ABSTRACT

An optical projector arrangement includes a light source. Light from the light source is formed into a collimated beam travelling along an axis by optics. The light is split into red, green and blue components travelling in different paths by a splitter. The components are subsequently recombined by a synthesizer to continue along the axis to a projection lens. A respective liquid crystal modulator is included in each different path. In order to increase the optical length of the path taken by the green component so that it is equal to the lengths of the paths taken by the red and blue components, a path length compensator is included in the path for the green component, which path would otherwise be along the axis for the whole of its length.

6 Claims, 3 Drawing Sheets

OPTICAL PROJECTOR ARRANGEMENT COMPRISING A COMPENSATOR

BACKGROUND OF THE INVENTION

This invention relates to an optical projector arrangement comprising a light source, an optical system for forming light from the source into a parallel beam travelling along a given axis in a given direction, a beam splitter and a beam synthesiser positioned in succession in the given direction along the given axis, the beam splitter being constructed and arranged for receiving the parallel beam travelling along the given axis, splitting it into first, second and third spectral components, and launching these components into first, second and third paths respectively to the beam synthesizer, the beam synthesizer being constructed and arranged for receiving the first, second and third spectral components travelling along the first, second and third paths respectively and combining them into a synthesized beam travelling along the given axis in the given direction, the total paths for the first and second components through the arrangement being of equal optical length, the first and second paths each having an initial portion which extends away from the given axis in a respective direction which is perpendicular to the given axis and the third path having initial and final portions which both extend along the given axis in the given direction, a first reflector arrangement constructed and arranged for receiving the first spectral component from the initial portion of the first path and directing it into a central portion of the first path which extends in the given direction parallel to the given axis and thereafter into a final portion of the first path which extends towards the given axis in a direction perpendicular thereto, a second reflector arrangement constructed and arranged for receiving the second spectral component from the initial portion of the second path and directing it into a central portion of the second path which extends in the given direction parallel to the given axis and thereafter into a final portion of the second path which extends towards the given axis in a direction perpendicular thereto, first, second and third liquid crystal light modulators included in the first, second and third paths respectively, and a projection lens for receiving the synthesized beam.

A known arrangement of this general kind is disclosed in U.S. Pat. No. 4,850,685, and is illustrated schematically in FIG. 1 of the accompanying diagrammatic drawings.

Referring to FIG. 1 it will be seen that, in the known projector arrangement, light from a light source 1 is focussed at 3 by a reflector 2 and is thereafter collimated by a condenser lens 4. The collimated light passes along an axis 5 through a polarizer 6 to a beamsplitter 8 in the form of a color separation cube prism. The constitution of such a cube prism is well known to those skilled in the art and will not be described in any great detail herein. The flat face 10 is coated with a red-reflecting dichroic layer, for example that available from the Corion company under the type number CR-600, and the flat face 12 is coated with a blue-reflecting dichroic layer, for example that available from the Corion company under the type number CR-500. The faces 10 and 12 intersect and are perpendicular to each other. They are each at 45° to the axis 5. The polarization axis of polarizer 6 is chosen to be perpendicular to the incidence surface of cube prism 8 (s-polarization). Thus it will be realized that light from the light source 2 which enters the cube prism 8 will be spectrally split such that the red component is reflected up, perpendicular to the axis 5, along a path 7 toward a first mirror arrangement, in this example mirrors 14, 18, and the blue component is reflected down, again perpendicular to the axis 5, along a path 9 toward a second mirror arrangement, in this example mirrors 16, 20. The green component of light will be simply transmitted by the cube prism 8 along the axis 5 to a beam synthesizer 30.

The red light component is reflected in a direction parallel to axis 5 from 45° mirror 14 to 45° mirror 18 and then reflected into a direction perpendicular to the axis 5 once again to the synthesizer 30. Similarly the blue light component is reflected in a direction parallel to axis 5 from 45° mirror 16 to 45° mirror 20 and then reflected into a direction perpendicular to the axis 5 once again to the synthesizer 30. Beam synthesizer 30 is constructed in a similar manner to the splitter 8; it takes the form of a cube prism the flat face 26 of which is coated with a red-reflecting dichroic layer and the flat face 28 of which is coated with a blue-reflecting dichroic layer. The faces 26 and 28 intersect and are perpendicular to each other. They are each at an angle of 45° to the axis 5. Coated face 26 redirects the red light along the axis 5 to a projection lens 32 and coated face 28 redirects the blue light along the axis 5 to the lens 32. The green light travelling along the axis 5 passes straight through synthesizer 30 to the lens 32.

Liquid crystal light modulators 22, 23 and 25 are included in the path 7 for the red light, the path 9 for the blue light and on the axis 5 between the splitter 8 and the synthesizer 30, i.e., in the path for the green light, respectively. Thus the red, blue and green components, modulated as necessary by one or more of the modulators 22, 23 and 25 respectively, are recombined by the synthesizer 30 and passed to the projection lens 32 for projecting the recombined light to, say, a screen (not shown) for viewing. A polarizer 24 is situated adjacent each modulator 22, 23 and 25 on the emission side thereof.

Thus each of the primary colors may be individually modulated by a dedicated liquid crystal modulator before being recombined by the synthesizer and passed to the lens 32 for projection.

There exists a problem with the known arrangement, however, this being that there is an optical path length difference through the arrangement between the green light and the red and blue light. When these primary colors are recombined by the synthesizer and passed to the lens for projection, this path length difference becomes manifest by degrading the optical quality of the projected image when viewed by an observer, because the three liquid crystal modulator panels have been illuminated to a different extent which leads to a colors cast in the viewed image. (The desirability of achieving equal path lengths in liquid crystal projectors, and possible optical component configurations for achieving this, are known, for example, from U.S. Pat. Nos. 5,184,234, 5,097,323, and 4,864,390.

It is an object of the present invention to at least alleviate the aforementioned shortcoming in an arrangement as defined in the first paragraph.

According to the invention an arrangement of the general kind specified in the first paragraph is characterized in that an optical path length compensator is provided in the third path for increasing the optical length of the total path for the third component through the arrangement to that of each of the first and second components through the arrangement.

Inclusion of such a compensator enables a higher-quality viewing image to be achieved while keeping the arrangement fairly compact.

BRIEF DESCRIPTION OF THE DRAWINGS

Embodiments of the invention will now be described, by way of example, with reference to the accompanying diagrammatic drawings in which.

DESCRIPTION OF THE PREFERRED EMBODIMENTS

Figure 1:
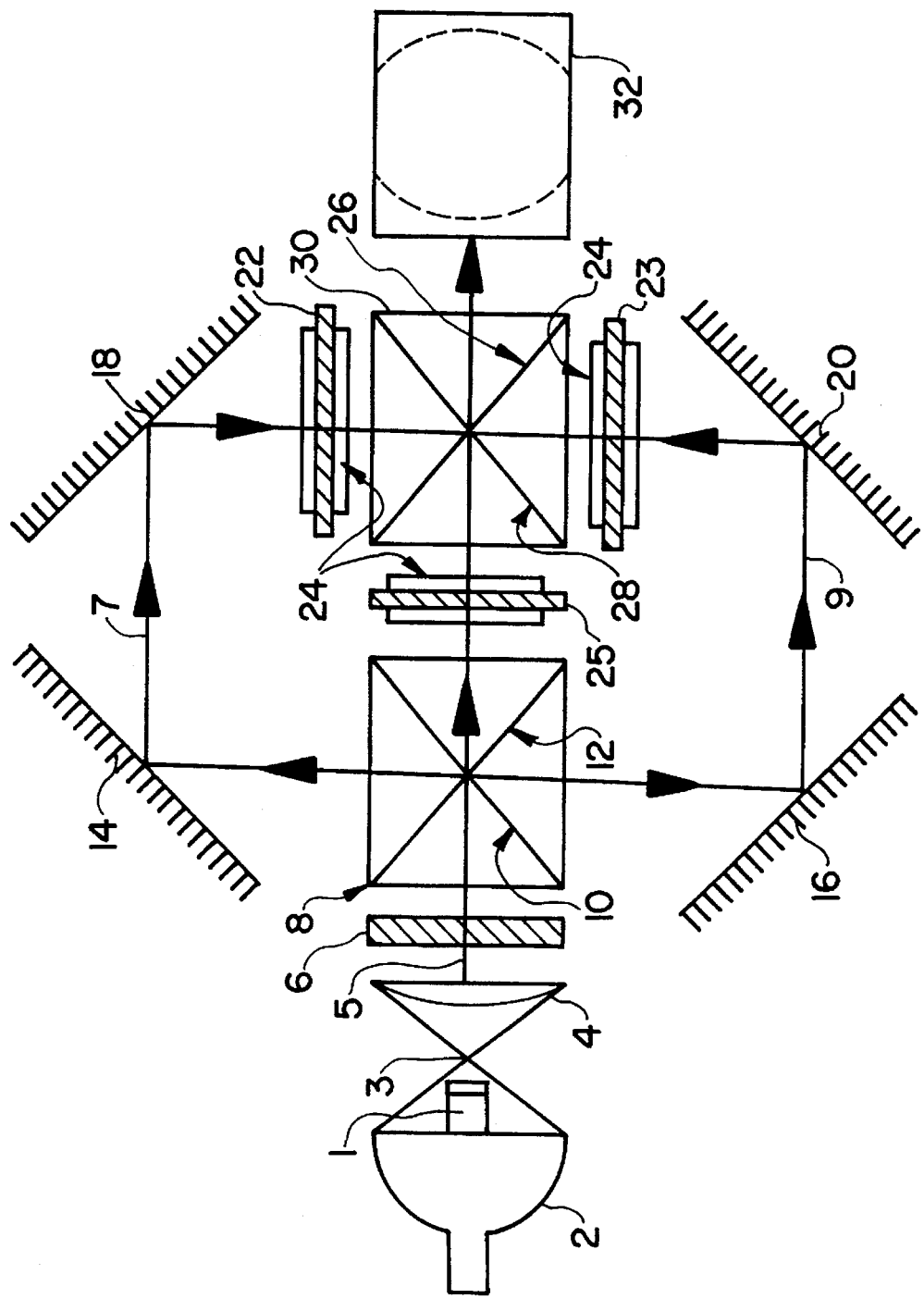
FIG. 1 shows schematically the known projector arrangement previously referred to, FIG. 2 shows schematically a projector arrangement in accordance with the present invention.
Figure 2:
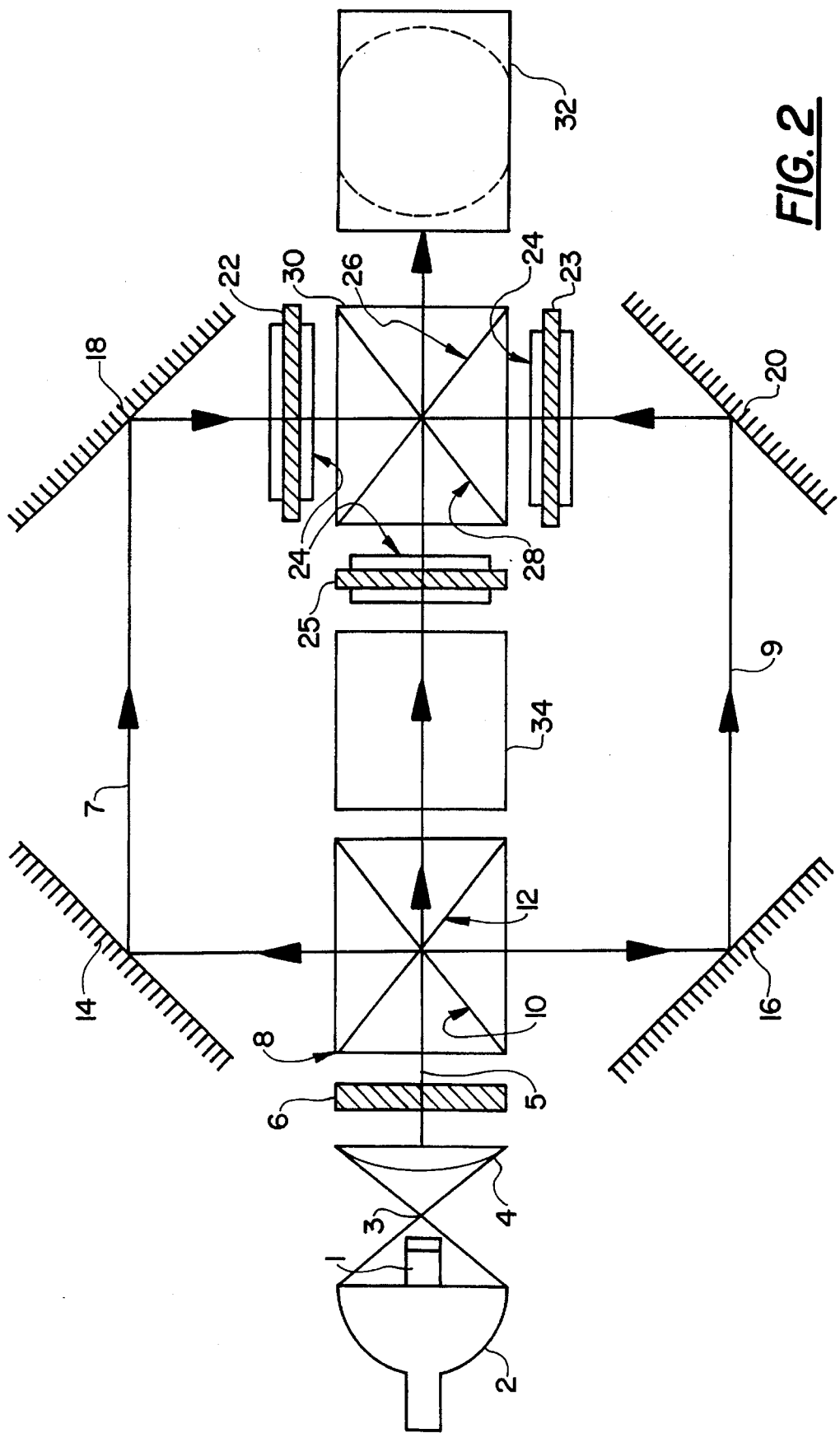

FIG. 2, in which corresponding components have been denoted by the same reference numerals as their counterparts in FIG. 1, shows an optical projector arrangement in accordance with the present invention. The arrangement of FIG. 2 is identical to that of FIG. 1 with the exception that the spacing between the splitter 8 and the liquid crystal light modulator 25 has been increased and, between these two components, an optical path length compensator has been included which increases the total length of the optical path taken by the green component of the light through the arrangement to the lengths of the optical paths for the red and blue components through the arrangement. (In practice this means making the optical path for the green component from the collimator lens 4 to the projection lens 32 equal in length to the lengths of the optical paths for the red and blue components between the lenses 4 and 32).

Figure 3:
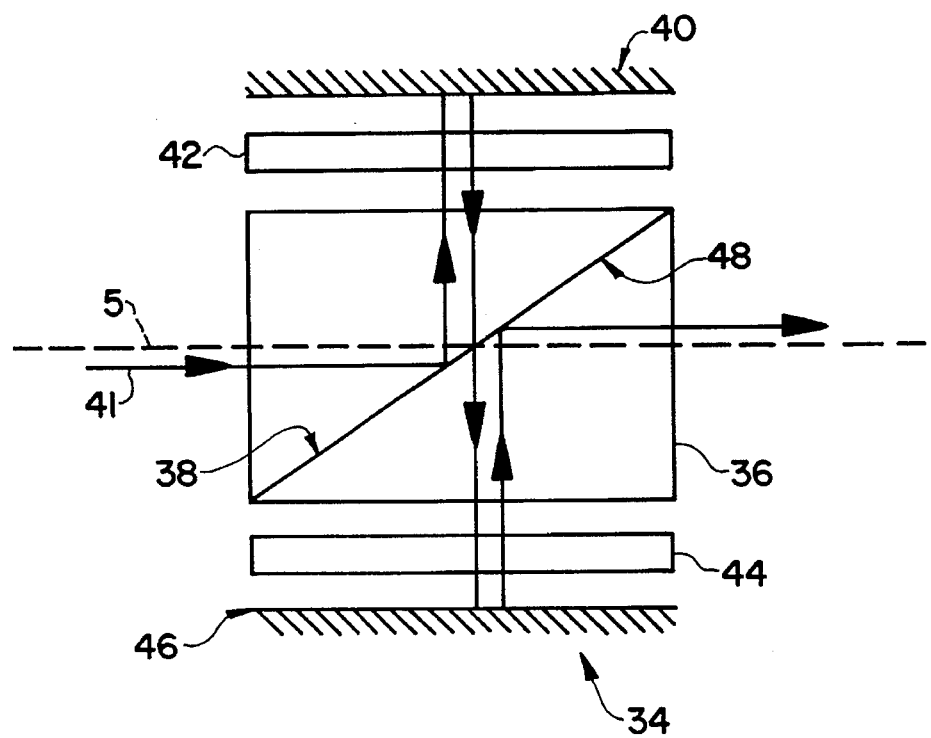
FIG. 3 shows schematically a first possible construction for an optical path length compensator included in the arrangement of FIG. 2.

FIG. 3 shows a first possible construction for the compensator 34 of FIG. 2. In this Figure the path of the light has been distorted in order to facilitate understanding. The green component of the light from the splitter 8, travelling initially and finally along the axis 5 (as in FIG. 1), enters a polarization splitting prism 36. Such a polarization splitting prism structure is known and comprises two optically coupled prisms with a multi-layer dielectric coating at the interface, for example of a material available from the aforementioned Corion company. This incoming light is s-polarised having already passed through polarizer 6, shown in FIG. 2, and is reflected from prism face 38 up towards a mirror 40 via a quarter-wave plate 42. On passing through the plate 42, the light becomes circularly polarized and the direction of circular polarization is then reversed by the reflection from the mirror 40. This reversed-direction circularly polarized light then passes again through plate 42 upon reflection and becomes linearly polarized, but at 90° to the original direction of polarization (p-polarized) and thus is directly transmitted by prism 36. This light is then incident upon a second quarter-wave plate 44/mirror 46 combination similar to the combination 40/42. Again the polarization state of the light is changed with the result that s-polarized light is finally reflected from prism face 48. The overall result of this is that the optical path length of the green component of incident light has been increased. By suitable choice of the spacing of the reflectors 40 and 46 it is arranged that substantially equal path lengths are present through the arrangement of FIG. 2 for the three primary colors red, green and blue.

Figure 4:
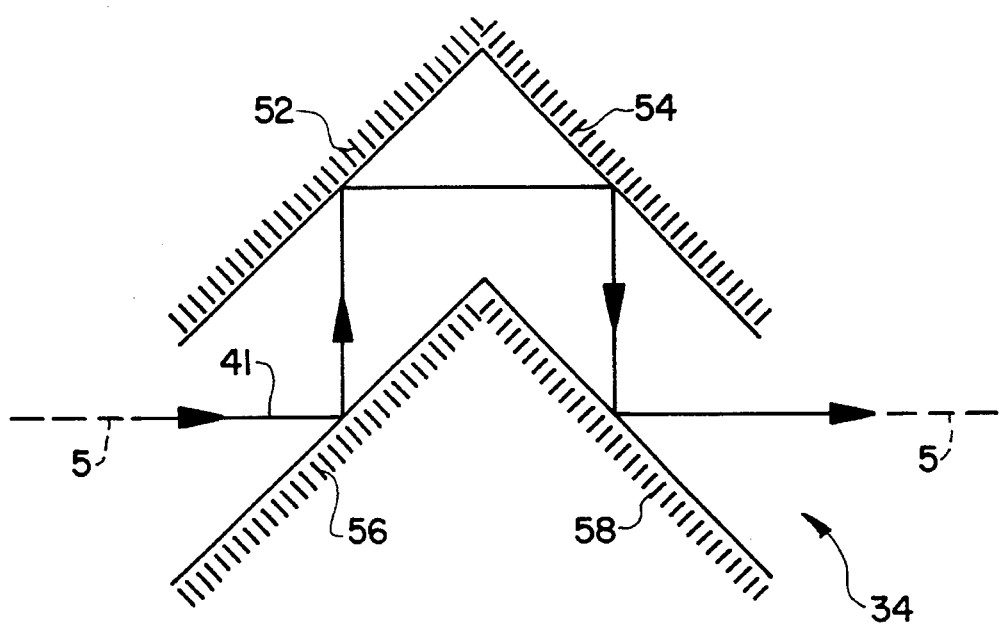
FIG. 4 shows schematically a second possible construction for such an optical path length compensator.

FIG. 4 shows a second possible construction for the compensator 34 of FIG. 2. In FIG. 4 the compensator 34 comprises two pairs of mirrors 52, 56 and 54, 58 respectively. The mirrors of each pair face and are parallel to each other and the mirrors of one pair are at 90° to the mirrors of the other pair. All mirrors are inclined at 45° to the axis 5. The incoming green component 41 of the incident light is reflected from each mirror as shown in FIG. 3 such that the overall path length is increased. Again by suitable choice of the spacing between the mirror pairs 52, 56 and 54, 58 it is arranged that substantially equal path lengths are present though the arrangement of FIG. 2 for the three primary colors.

It will be understood that, regardless of whether the construction of FIG. 3 or FIG. 4 is employed for the compensator 34, the direction of diversion thereby of the green component of the light is preferably into and out of the plane of FIG. 2, because (and this is particularly so with the construction of FIG. 4) a diversion in the plane of FIG. 2 may interfere with the red or blue diverted components.

I claim:

1. An optical projector arrangement comprising:

a light source, an optical system for forming light from said light source into a parallel beam travelling along a main optical axis in a given direction, a beam splitter and a beam synthesizer positioned in succession in the given direction along the main optical axis, the beam splitter being constructed and arranged for receiving the parallel beam travelling along the main optical axis, splitting it into first, second and third spectral components, and launching these components into first, second and third paths respectively to the beam synthesizer, the beam synthesizer being constructed and arranged for receiving the first, second and third spectral components travelling along the first, second and third paths respectively and combining them into a synthesized beam travelling along the main optical axis in the given direction, the total paths for the first and second components through the arrangement being of equal optical length, the first and second paths each having an initial portion which extends away from the main optical axis in a respective direction which is perpendicular to the main optical axis and the third path having initial and final portions which both extend along the main optical axis in the given direction, a first reflector arrangement constructed and arranged for receiving the first spectral component from the initial portion of the first path and directing it into a central portion of the first path which extends in the given direction parallel to the main optical axis and thereafter into a final portion of the first path which extends towards the main optical axis in a direction perpendicular thereto, a second reflector arrangement constructed and arranged for receiving the second spectral component from the initial portion of the second path and directing it into a central portion of the second path which extends in the given direction parallel to the main optical axis and thereafter into a final portion of the second path which extends towards the main optical axis in a direction perpendicular thereto, first, second and third liquid crystal light modulators included in the first, second and third paths respectively, a projection lens for receiving the synthesized beam, an optical path length compensator provided in the third path for increasing the optical length of the total path for the third component through the arrangement to that of each of the first and second components through the arrangement, the beam splitter and the beam synthesizer each comprising a first pair of flat dichroic mirrors which intersect each other, which are perpendicular to each other, and which are inclined at 45° to the main optical axis, one mirror of each pair being reflective for the first spectral component and transmissive for the second and third spectral components, and the other mirror of each pair being reflective for the second spectral component and transmissive for the first and third spectral components, corresponding mirrors of each pair being perpendicular to each other, and a plane polarizer for the light of the parallel beam, wherein the optical path length compensator comprises a second pair of mirrors which face one another and between which the main optical axis passes, a polarization splitter positioned between the mirrors of the pair so as to be intersected by the main optical axis, and first and second quarter-wave plates positioned between the polarization splitter and respective mirrors of the second pair, such that plane polarized light travelling in operation along the main optical axis in the given direction will be reflected by the polarization splitter to one mirror of the further pair, will thereafter be reflected by the one mirror of the further pair to the other mirror of the further pair, will thereafter be reflected by the other mirror of the second pair to the polarization splitter, and will thereafter be reflected by the polarization splitter to continue along the given axis.

2. An arrangement as claimed in claim 1, wherein each of the beam splitter and the beam synthesizer comprises a pair of flat dichroic mirrors which intersect each other, which are perpendicular to each other, and which are inclined at 45° to the main optical axis, one mirror of each pair being reflective for the first spectral component and transmissive for the second and third spectral components, and the other mirror of each pair being reflective for the second spectral component and transmissive for the first and third spectral components, corresponding mirrors of each pair being perpendicular to each other.

3. An arrangement as claimed in claim 1, wherein each reflector arrangement comprises a first flat reflective surface positioned at the junction of the initial and central portions of the corresponding path and a second flat reflective surface positioned at the junction point of the central and final portions of the corresponding path, the first and second reflective surfaces of the first reflector arrangement facing and running parallel to the one mirror of the beam splitter and the one mirror of the beam synthesizer, respectively, and the first and second reflective surfaces of the second reflector arrangement facing and running parallel to the other mirror of the beam splitter and the other mirror of the beam synthesizer, respectively.

4. An optical projector arrangement comprising:

a light source, an optical system for forming light from said light source into a parallel beam travelling along a main optical axis in a given direction, a beam splitter and a beam synthesizer positioned in succession in the given direction along the main optical axis, the beam splitter being constructed and arranged for receiving the parallel beam travelling along the main optical axis, splitting it into first, second and third spectral components, and launching these components into first, second and third paths respectively to the beam synthesizer, the beam synthesizer being constructed and arranged for receiving the first, second and third spectral components travelling along the first, second and third paths respectively and combining them into a synthesized beam travelling along the main optical axis in the given direction, the total paths for the first and second components through the arrangement being of equal optical length, the first and second paths each having an initial portion which extends away from the main optical axis in a respective direction which is perpendicular to the main optical axis and the third path having initial and final portions which both extend along the main optical axis in the given direction, a first reflector arrangement constructed and arranged for receiving the first spectral component from the initial portion of the first path and directing it into a central portion of the first path which extends in the given direction parallel to the main optical axis and thereafter into a final portion of the first path which extends towards the main optical axis in a direction perpendicular thereto, a second reflector arrangement constructed and arranged for receiving the second spectral component from the initial portion of the second path and directing it into a central portion of the second path which extends in the given direction parallel to the main optical axis and thereafter into a final portion of the second path which extends towards the main optical axis in a direction perpendicular thereto, first, second and third liquid crystal light modulators included in the first, second and third paths respectively, a projection lens for receiving the synthesized beam, and an optical path length compensator provided in the third path for increasing the optical length of the total path for the third component through the arrangement to that of each of the first and second components through the arrangement, the beam splitter and the beam synthesizer each comprising a pair of flat dichroic mirrors which intersect each other, which are perpendicular to each other, and which are inclined at 45° to the main optical axis, one mirror of each pair of said flat dichroic mirrors being reflective for the first spectral component and transmissive for the second and third spectral components, and the other mirror of each pair of said flat dichroic mirrors being reflective for the second spectral component and transmissive for the first and third spectral components, corresponding mirrors of each pair of said flat dichroic mirrors being perpendicular to each other, the optical path length compensator comprising first and second pairs of mirrors, the mirrors of said first and second pairs facing and being parallel to each other and the mirrors of said first and second pairs being inclined at 90° to the mirrors of the other further pair, each mirror of each further pair being inclined at 45° to the given axis, such that light travelling in operation along the main optical axis will be reflected by one mirror of one of said first and second pairs to the other mirror of said one of said first and second pairs, then to one mirror of said first and second pairs, then to the other mirror of said first and second pairs, and then to continue along the given axis.

5. An arrangement as claimed in claim 4, wherein each of the beam splitter and the beam synthesizer comprises a pair of flat dichroic mirrors which intersect each other, which are perpendicular to each other, and which are inclined at 45° to the main optical axis, one mirror of each pair being reflective for the first spectral component and transmissive for the second and third spectral components, and the other mirror of each pair being reflective for the second spectral component and transmissive for the first and third spectral components, corresponding mirrors of each pair being perpendicular to each other.

6. An arrangement as claimed in claim 4, wherein each reflector arrangement comprises a first flat reflective surface positioned at the junction of the initial and central portions of the corresponding path and a second flat reflective surface positioned at the junction point of the central and final portions of the corresponding path, the first and second reflective surfaces of the first reflector arrangement facing and running parallel to the one mirror of the beam splitter and the one mirror of the beam synthesizer, respectively, and the first and second reflective surfaces of the second reflector arrangement facing and running parallel to the other mirror of the beam splitter and the other mirror of the beam synthesizer, respectively.

* * * * *